United States Patent [19]

Matsuzaka et al.

[11] Patent Number: 4,698,089
[45] Date of Patent: Oct. 6, 1987

[54] OPTICAL ELEMENT FORMING APPARATUS

[75] Inventors: Kenzo Matsuzaka, Kawasaki; Seitaro Okano, Tokyo; Nobuo Nakamura, Yokohama, all of Japan

[73] Assignee: Canon Kabushiki Kaisha, Tokyo, Japan

[21] Appl. No.: 774,395

[22] Filed: Sep. 10, 1985

Related U.S. Application Data

[62] Division of Ser. No. 570,835, Jan. 16, 1984, abandoned.

[30] Foreign Application Priority Data

| Jan. 28, 1983 | [JP] | Japan | 58-13554 |
| Aug. 29, 1983 | [JP] | Japan | 58-156494 |
| Sep. 13, 1983 | [JP] | Japan | 58-167531 |

[51] Int. Cl.[4] .............................. B29D 11/00
[52] U.S. Cl. ........................ 65/290; 65/305; 65/323; 425/400; 425/808
[58] Field of Search ............. 65/291, 286, 287, 273, 65/275, 290, 305, 323, 359, 68, 82, 76, 77, 106, 102; 264/2.7, 1.1, 1.2, 2.2; 425/808, 398, 395, 400

[56] References Cited

U.S. PATENT DOCUMENTS

| 2,728,106 | 12/1955 | Herman et al. | 425/808 X |
| 4,113,224 | 9/1978 | Clark et al. | 425/808 X |
| 4,211,384 | 7/1980 | Bourset et al. | 425/808 X |
| 4,300,821 | 11/1981 | Mignen | 425/808 X |
| 4,347,198 | 8/1982 | Ohkada et al. | 425/808 X |

FOREIGN PATENT DOCUMENTS

| 1015100 | 3/1950 | France | 425/808 |
| 49-39794 | 1/1974 | Japan. | |
| 13646 | of 1909 | United Kingdom | 65/305 |

Primary Examiner—Kenneth M. Schor
Attorney, Agent, or Firm—Fitzpatrick, Cella, Harper & Scinto

[57] ABSTRACT

An optical glass forming apparatus for molding an optical element such as a lens by pressurizing optical glass, wherein a mold for molding one functional surface (optically functional surface) of the optical element is designed to be urged against the upper edge portion of a mold for forming the other functional surface of the optical element.

2 Claims, 10 Drawing Figures

OPTICAL ELEMENT FORMING APPARATUS

This application is a division of application Ser. No. 570,835, filed Jan. 16, 1984, now abandoned.

BACKGROUND OF THE INVENTION

1. Field of the Invention

This invention relates to an apparatus for forming optical elements such as lenses, prisms or filters, and more particularly to the molds thereof.

2. Description of the Prior Art

Heretofore, optical elements such as lenses, prisms or filters have often been manufactured by the glass polishing process. However, the polishing process requires a considerable time and skill. Also, to manufacture aspherical lenses by the polishing process, a higher polishing technique is necessary and the processing time unavoidably becomes long. In contrast with such an optical element manufacturing method using the polishing process, there is a method of manufacturing optical elements by the molding using heating and pressurization. (See U.S. Pat. Nos. 3,833,347; 3,900,328; 4,139,677; etc.) According to this molding method, optical elements can be manufactured within a short time and even aspherical lenses, like spherical lenses, can be manufactured easily and within a short time, but problems are still left to be solved in this molding method using heating and pressurization. One of the problems is the improvement of decentering. In the case of spherical lenses, even if there is decentering thereof, alignment can be effected in the post-process, while in the case of aspherical lenses, alignment cannot be effected and consideration must be given to the structure of the mold.

Heretofore, molding has been effected by a structure comprising a fixed mold, a lower mold and an upper mold as shown in FIG. 1 of the accompanying drawings and a mating portion has been provided between the upper mold and the lower mold although there has been more or less modification thereof, and there has been a disadvantage that the accuracy of mating directly affects the accuracy of decentering. That is, in the apparatus of the prior art shown in FIGS. 1(a) and (b), the design is such that a mass of heated glass is placed on a lower mold 2 held by a fixed mold 1 and the spherical surface of a lens is formed by pressing an upper mold 4 against the lower mold 2 by means of a hydraulic cylinder (not shown). The upper mold 4 of this prior art apparatus mates with the inner surface 1a of the fixed mold 1 and is designed to be moved along a predetermined axis $O_1$–$O_2$, but the presence of the sliding mating portion 1a between the fixed mold 1 and the upper mold 4 makes it difficult to make the axis of the lower mold completely coincident with the axis of the upper mold. Due to the incoincidence between these axes, in the case of a lens 6 as shown in FIG. 2 of the accompanying drawings, the centers of sphere $a_1$ and $b_1$ of the functional surfaces 6a and 6b of the lens are not coincident with the optic axis and thus, the lens thicknesses $T_1$ and $T_2$ become different from each other and decentering occurs in the lens 6.

As described above, the prior art apparatus suffers from the problem that decentering of the lens is liable to occur and further, in the apparatus using press molding with the upper and lower molds as previously described, it is necessary to set with high accuracy the pressing position of the upper and lower molds in a case where the functional surfaces of the optical element are aspherical, and there are many problems still left to be solved such as the design of the molds and complication of the structure of the apparatus.

SUMMARY OF THE INVENTION

It is an object of the present invention to provide an apparatus which is capable of forming an optical element which is free of decentering of the functional surfaces thereof.

It is another object of the present invention to provide a forming apparatus suitable for molding an optical element whose functional surfaces are spherical or aspherical.

It is still another object of the present invention to provide a forming apparatus which can mold a flange portion on the outer periphery of the functional surfaces of an optical element such as a lens and can form a holding portion convenient to hold the optical element by an element holding member.

The invention will become fully apparent from the following detailed description thereof taken in conjunction with the accompanying drawings.

DESCRIPTION OF THE PREFERRED EMBODIMENTS

Figure 1A:
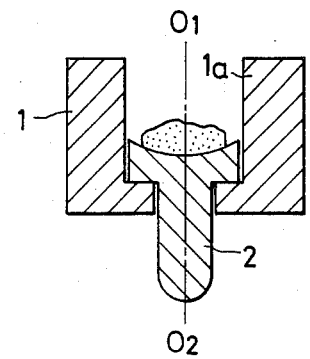
FIGS. 1(a) and (b) are cross-sectional views of an apparatus according to the prior art.
Figure 1B:
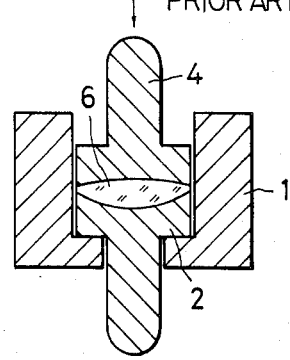
Figure 2:
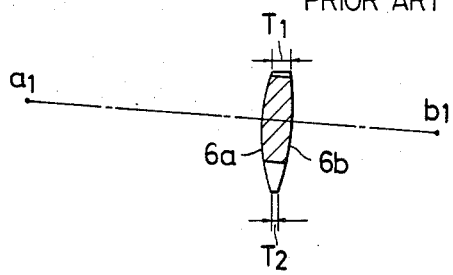
FIG. 2 is a cross-sectional view of a lens molded by the prior art apparatus.

FIGS. 3 to 6 show an apparatus according to a first embodiment of the present invention. In these Figures, reference numeral 8 designates a first forming mold. The upper surface 8a of the first mold 8 for forming the functional surface of an optical element may be a spherical surface or an aspherical surface depending on the optical element 10 to be molded. A mold member 8b is fixed to the main body 8 of the first mold and forms a part of the first mold.

Reference numeral 12 denotes a second mold. The lower surface 12a of the second mold 12 is finished so as to form the functional surface of the optical element 10 which effects actions such as refraction action and reflection action, and is machined into a curved surface complementary to the shape of the optical element 10, for example, a spherical surface shape.

The upper edge portion c of the first mold member 8b is finished to be urged against the molding surface of the second mold 12 or the extension thereof, and the edge portion c may be more or less chamfered to improve the stability of the state in which the first mold is urged against the second mold and the durability against shock. A clearance $8b_1$ into which the remainder of the pressurized glass material may escape is provided near the upper edge portion of the first mold member 8b, as shown in FIG. 4.

Figure 4:
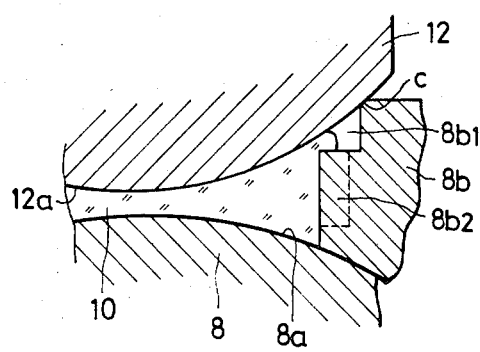
FIG. 4 is an enlarged view of a portion of the apparatus shown in FIG. 3.

Alternatively, the clearance $8b_1$ may be provided in another portion, for example, a clearance $8b_2$ may be provided in the side mold member 8b of the first mold which forms the non-functional surface of the optical element indicated by the dotted line in FIG. 4 so that the remainder of the optical glass material which enters this clearance may be utilized for the fitting or coupling to a lens barrel (not shown).

Figure 3:
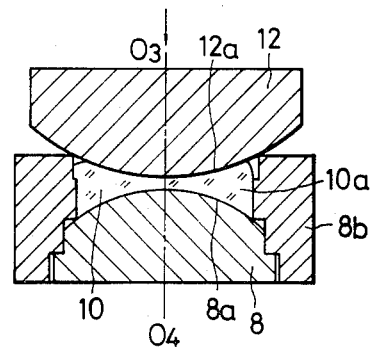
FIG. 3 is a cross-sectional view of the essential portions of an apparatus according to an embodiment of the present invention.

In the molding apparatus of FIGS. 3 and 4, an optical glass material is inserted into the recess of the first mold 8, 8b, whereafter the second mold 12 is pressed in the direction of the arrow (FIG. 3) by a hydraulic cylinder, not shown, to cause the second mold 12 to be directly urged against the upper edge portion c of the first mold. Thereby, the optical glass is formed into an optical element such as a lens having the space shape formed by the first mold 8, 8b and the second mold 12.

If the second mold and the hydraulic cylinder (not shown) are connected together by a conventional universal joint mechanism during the movement of the second mold of FIG. 3 in the direction of the arrow, even if the second mold 12 vibrates more or less to the left and right of a predetermined axis $O_3-O_4$ during the pressing operation of the second mold in the direction of arrow by the hydraulic cylinder, the center thickness of the formed optical element 10 can be made constant by finishing the pressing surface 12a of the second mold into a spherical surface and thus, decentering of the functional surface can be prevented.

In the apparatus of the embodiment of FIGS. 3 and 4 which comprises the first mold and the second mold, the first mold 8 for forming the functional surface of the molded lens 10 and the mold member 8b for forming the edge portion 10a of the molded lens 10 must be made integral as a single first mold.

For this reason, the finish of the finished surface of the first mold 8, 8b is carried out in such a manner that the functional surface 8a of the first mold 8 is first finished, the mold member 8b is fixed to the first mold 8, and then the inner diametral surface of the mold member 8b is finished to predetermined accuracy while, at the same time, the upper edge portion c of the mold member 8b is machined to predetermined accuracy with a curvature corresponding to the curvature of the second mold 12.

Figure 6:
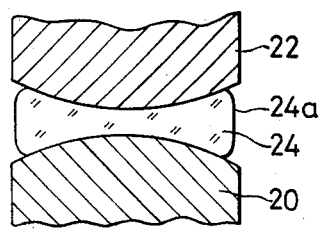
FIG. 6 is a cross-sectional view of the essential portions of still another embodiment of the present invention.

Further, the present invention is also applicable to a so-called open type molding apparatus which, as shown in FIG. 6, does not have a mold member for guiding the edge portion 24a of a molded lens 24 molded by a first mold 20 and a second mold 22.

Figure 5:
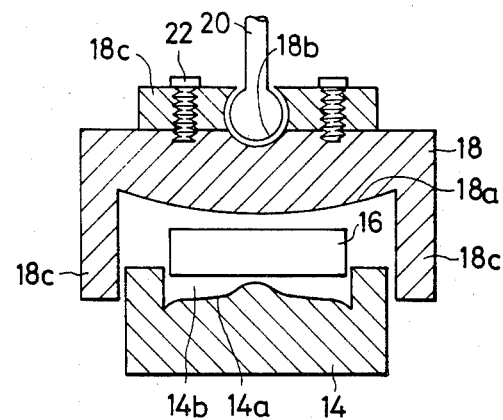
FIG. 5 is a cross-sectional view of the essential portions of an apparatus according to another embodiment of the present invention.

It is desirable to choose a material having a coefficient smaller than the coefficient of linear expansion of the glass material to be molded as the material of the mold member of the apparatus of the present invention. FIG. 5 shows an embodiment in which the second mold is connected to a universal joint mechanism. In FIG. 5, reference numeral 14 designates a first mold member having a recess 14b in the central portion thereof which has a molding surface 14a machined into an aspherical surface complementary to the outer peripheral surface of an optical element to be molded. Reference numeral 16 denotes a blank of optical glass pre-heated and subjected to a primary molding to facilitate the molding. A second mold member 18 comprises a curved surface, for example, a spherical surface 18a for forming the functional surface of the optical element to be molded, a connecting portion 18b connecting the second mold member 18 to a universal joint mechanism 20, and leg portions 18c, 18c. Reference numeral 22 designates coupling members for coupling the second mold member 18 to the joint 20.

Figure 7:
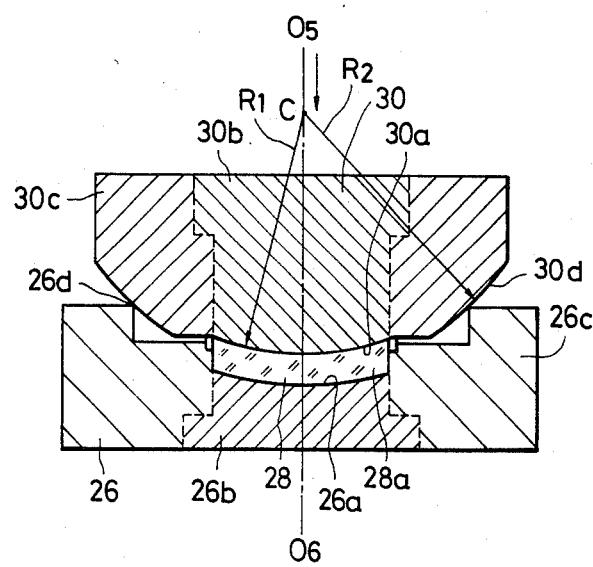
FIG. 7 is a cross-sectional view of the essential portions of yet another embodiment of the present invention.
Figure 8:
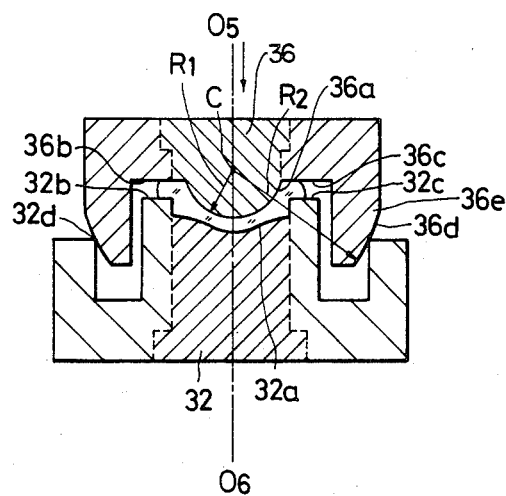
FIG. 8 is a cross-sectional view of the essential portions of a further embodiment of the present invention.

FIGS. 7 and 8 show apparatuses according to further embodiments of the present invention. In FIG. 7, a blank 28a for forming an optical element, such as moldable glass, is disposed in a recess formed by the mold members 26b and 26c of a first mold 26. In this case, the blank 28a may be pre-heated to a moldable temperature and inserted into the mold or the blank 28a may be disposed in the mold and the interior of the mold may be heated to render the blank 28a moldable.

The first mold 26 comprises the mold member 26b and the mold member 26c. The mold member 26b has a surface 26a for forming the functional surface of an optical element, and the optical axis of this surface 26a is made coincident with the axis of the cylinder of the mold member 26c. The surface 26a for forming the functional surface of the optical element may be a spherical surface or an aspherical surface in conformity with the shape of the optical element 28 to be molded. On the other hand, the mold member 26c has an upper annular edge portion 26d.

The upper annular edge portion 26d so called in the present embodiment is the end portion of the upper edge of the mold member 26c, and more specifically is the portion of contact with a second mold 30. This upper annular edge portion 26d is a portion for realizing a true circular shape concentric with the optic axis of the surface 26a for forming a first functional surface of the optical element and therefore, it may be formed into a continuous surface or a discontinuous surface (for example, where a cut-away is present in a portion of the circumference of the annulus) or three or more points disposed in the shape of a true circle. Further, this upper annular edge portion 26d may be chamfered by a required amount to improve the stability of the pressure contact thereof with the second mold 30 and the durability to the shock resulting from the pressure contact.

The mold member 26b and the mold member 26c may also be integral with each other instead of being separate from each other as in the present embodiment. Where these two mold members are provided separately from each other, the materials thereof may be chosen in accordance with the characteristics thereof. The material of the mold member 26b may be a material suitable for forming the functional surface, namely, a material which will readily permit elaborate mirror surface machining, and the material of the mold member 26c may be a material excellent in durability to the shock and abrasion resulting from the pressure contact thereof with the second mold 30.

On the other hand, the second mold 30 comprises a mold member 30b and a mold member 30c. The mold member 30b has a spherical surface 30a for forming a second functional surface of the optical element 28, and the mold member 30c has an aligning spherical surface 30d. This aligning spherical surface 30d has the same center of sphere C as the center of sphere of the spherical surface 30a for forming the second functional surface of the optical element 28 and is provided outside the spherical surface 30a, and it is a portion adapted to be urged against the upper annular edge portion 26d of the mold member 26c of the first mold during pressure molding. The radius of curvature $R_2$ of the aligning spherical surface 30d may be the same as or different from the radius of curvature $R_1$ of the surface 30a for forming the functional surface, but as described above, it is important that the centers of sphere C of these are coincident with each other.

The mold member 30b and the mold member 30c also may be integral with each other instead of being separate from each other as in the present embodiment. Where the mold members 30b and 30c are provided separately from each other, as in the case of the mold members 26b and 26c of the first mold, the material of the mold member 30b may be a material suitable for forming the functional surface and the material of the mold member 30c may be a material excellent in durability to the shock and abrasion resulting from the pressure contact thereof with the first mold 26.

Further, the second mold 30 is connected or integral with a pressing mechanism (not shown) such as a hydraulic cylinder for pressing the same, during pressing. This pressing mechanism for urging the first and second molds against each other may be connected or integral with the first mold or the both molds during pressing.

Subsequently, the second mold 30 is pressed in the direction of arrow by the use of a hydraulic cylinder (not shown) and urged so that the aligning spherical surface 30d comes into direct contact with all of the upper annular edge portion 26d, and the blank 28a for forming the optical element is pressed and deformed by at least the surfaces 26a and 30a for forming the functional surfaces, thereby forming the optical element 28.

At this time, the molds 30 and 26 are heated as required in order to obtain a good molding condition.

In the above-described pressing and molding step, when the aligning spherical surface 30d of the second mold 30 contacts the upper annular edge portion 26d, the center axis of the annulus passes through the center of sphere without fail and thus, the center axis of the upper annular edge portion 26d, namely, the optic axis of the surface 26a of the first mold 26 for forming the functional surface automatically becomes coincident with the axis passing through the center of sphere C of the aligning spherical surface 30d of the second mold 30, namely, the optic axis of the surface 30a for forming the functional surface which has the same center of sphere C as said center of sphere. Accordingly, the optical element can be formed without causing any decentering and moreover, the center thickness of the optical element is primarily determined and can always be constant.

After completion of the molding, the second mold 30 and the first mold 26 are gradually cooled to a temperature which permits removal of the molded article, with the positional relation between the two molds maintained, and the molded optical element is removed out of the molds. Further, the optical element is subjected to a predetermined machining process as required.

On the other hand, in the conventional metal mold or the like, the surface for forming the functional surface of an optical element has been formed into a shape complementary to the curvature of the molded article, but the surface state thereof has not been taken into consideration and the post-machining of the functional surface after the molding has been requisite. In contrast, in the apparatus of the present embodiment, the surface state of the surfaces 26a and 30a for forming the functional surfaces of an optical element is finished so that the functional surfaces of the molded optical element have a predetermined surface accuracy and surface quality in conformity with the usage thereof, and then the optical element is subjected to the pressing and molding of the present invention, whereby the optical element directly usable as a product can be obtained without post-machining.

According to the apparatus of the present embodiment as described above, the second mold for forming one functional surface of the optical element is urged against the first mold for forming the other functional surface of the optical element without pressing the molds by fitting or sliding movement as in the conventional method, whereby the optical element can be press-molded without causing any decentering thereof and moreover, a predetermined center thickness of the optical element can always be obtained.

Further, aspherical lenses of which the decentering could hardly be modified by post-machining in the conventional press molding method can be easily molded on a mass production scale.

Also, according to the method of the present invention, optical elements having a quality as products can be molded without being subjected to post-machining and optical elements of lower manufacturing cost can be produced on a mass production scale.

Figure 9:
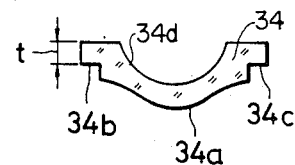
FIG. 9 is a cross-sectional view of a lens molded by the apparatus of FIG. 8.

The embodiment shown in FIG. 8 is a modification of the FIG. 7 apparatus. The apparatus of FIG. 8 is an apparatus which can mold a flange portion for attaching an optical element, for example, a lens, to a lens holder integrally with the lens body. FIG. 9 shows a lens 34 molded by the molding apparatus shown in FIG. 8.

In FIGS. 8 and 9, reference numeral 32 designates a first mold member. The first mold member 32 has a molding surface 32a for forming the functional surface 34a of the lens 34, flange molding surfaces 32b and 32c extending from the molding surface 32a to mold the flange portions 34b and 34c on the outer periphery of the functional surface 34a of the lens 34, and an edge portion 32d adapted to be urged against a second mold member 36. The second mold member 36 is provided with a molding surface 36a for molding the functional surface 34d of the lens 34, and flange molding surfaces 36b and 36c provided on the extension of the outer periphery of the molding surface 36a and parallel to the flange molding surfaces 32b and 32c of the first mold member 32.

Designated by 36d is an aligning spherical surface which is in contact with the edge portion 32d of the first mold member 32 and is formed on the outer periphery of an extension 36e extending from the body portion of the mold member 36. The center of sphere C of this aligning spherical surface 36d and the center of sphere C of the molding surface 36a lie at the same point. $R_1$ and $R_2$ represent the radii from the center of sphere C to the molding surface 36a and the aligning spherical surface 36d, respectively. The molding action of the apparatus shown in FIG. 8 is just the same as the molding action described in connection with FIG. 7. A material to be molded is inserted between the first mold member and the second mold member, whereafter the first and second mold members 32 and 36 are pressed by a pressing device, not shown, and when the edge portion 32d of the first mold member 32 and the aligning spherical surface 36d of the second mold member 36 are urged against each other, the spacing between the flange molding surfaces 32b and 36b (32c and 36c) of the first and second mold members, respectively, is set to the same dimension as the thickness t of the flange portion of the lens 34.

The material to be molded pressed by the first and second mold members is molded by the molding surfaces 32a and 36a of the mold members 32 and 36, whereby a functional surface having a desired curved or spherical surface is obtained and a flange portion is molded with a predetermined thickness t on the outer periphery of the functional surface.

Description will now be made of an example in which a lens is molded by the use of the FIG. 7 apparatus. First, a mold member 30b of molybdenum having a spherical surface 30a for forming the functional surface of an optical element finished by a mirror surface polishing process so as to have an outside diameter of 30 mm, a radius of curvature of 40 mm, a shape of surface accuracy of three or less Newton ring power lines and one irregular power line and average surface roughness (JIS B 0601-1970) of 0.02 μm or less was inserted and incorporated into a mold member 30c formed of a carbide alloy or silicon carbide moldings subjected to a predetermined machining process, whereafter the aligning spherical surface 30d thereof was machined so that its radius of curvature was 44 mm and the deviation between the center of sphere of this spherical surface and the center of sphere of the spherical surface 30a for forming the functional surface was 2 μm or less, whereby a mold 30 was obtained.

Subsequently, a mold member 26b of molybdenum having an outside diameter of 40 mm, a curvature of 60 mm and a surface 26a for forming the functional surface which was mirror-surface-polished like the spherical surface 30a of the mold for forming the functional surface was inserted and incorporated into a mold member 26c formed of silicon carbide moldings subjected to a predetermined machining process, whereafter the upper annular edge portion 26d thereof was machined so that its inside diameter was 60 mm and the deviation of the axis of the upper annular edge portion 26d relative to the optic axis of the surface 26a for forming the functional surface was 2 μm or less, whereby a mold 26 was obtained.

As the blank of a lens, use was made of a blank comprising optical glass SF14 shaped into a disc having an outside diameter of 40 mm and a thickness of 5.6 mm and having its both sides polished into mirror surfaces, and this blank was heated to 580° C. and inserted into a recess formed by the mold member 26b and the mold member 26c, whereafter the mold 30 was pressed against the mold 26 with a pressure of 10 Kg/cm² by a hydraulic cylinder (not shown) while the interior of the mold was maintained at said temperature so that the aligning spherical surface 30d of the second mold was in contact with the whole of the upper annular edge portion 26d of the first mold, and this condition was maintained for five minutes, whereafter the blank was gradually cooled in the mold, and then was precisely cooled down to the room temperature.

The decentering of the lens removed out of the mold after completion of the cooling was within 30 seconds and the surface accuracy of the functional surface thereof was three or less Newton ring power lines and one or less irregular power line and the average surface roughness (JIS B 0601-1970) was 0.02 μm or less, and thus this lens was directly usable as a lens.

As described above, according to the present invention, a molding apparatus comprising an upper and a lower mold for molding an optical element is designed such that the upper mold for molding one functional surface of the optical element is urged against the upper edge portion of the lower mold for molding the other functional surface of the optical element and that the sliding portion or the mating portion of the upper and lower molds shown in the apparatus of the prior art is absent, whereby the decentering of the molded optical element can be eliminated. Another feature of the present invention is that the surface of the present invention is that the surface of the upper mold of the mold forming members is made into a spherical surface and the upper mold is adapted to be urged against the lower mold through a universal joint mechanism, whereby the decentering of the functional surfaces of the optical element can be eliminated.

In the embodiment of FIG. 4, clearances $8b_1$ and $8b_2$ as escape portions for the remainder of optical glass are provided in the lower mold member 8b, but alternatively, such clearances may be provided in the non-functional surface portion of the spherical surface 12a of the upper mold member 12, i.e., the other surface than the functional portion as the spherical surface of a lens.

We claim:

1. A forming apparatus for molding an optical glass lens having at least one aspherical functional surface and a flange portion, said apparatus comprising, in combination for molding, a first, fixed mold member and a second, movable mold member that can be positioned with respect to the first mold member to cooperatively mold an optical glass lens, wherein said first mold member comprises:

an aspherical molding surface of said first mold member for forming an aspherical surface of the optical glass lens, a flange forming surface of said first mold member extending from the outer periphery of said aspherical molding surface; and an edge portion of said first mold member extending from the outer periphery of said flange forming surface, wherein said second mold member comprises:

a spherical molding surface of said second mold member having a radius $R_1$ for forming a functional surface of the optical glass lens, a flange forming surface of said second mold member adjacent to and extending from the periphery of said spherical molding surface for cooperating with said flange forming surface of said first mold member to form the flange portion of the optical glass lens, and an aligning spherical surface of said second mold member extending from the periphery of said flange forming surface of said second mold member and having a center identical to that of said spherical molding surface and having a radius different from that of said spherical molding surface, wherein said aligning spherical surface of said second mold member is structured such that it will engage with said edge portion of said first mold member by movement of said second mold member to determine the distance between said first and second mold members for forming the functional surfaces and the flange portion of the optical glass lens, and wherein said flange forming surfaces are not of spherical curvature and provide a lens flange whose curvature is not spherical.

2. An optical glass lens forming apparatus comprising, in combination for molding, first and second mold members that can be positioned with respect to each other to cooperatively mold an optical glass lens, each mold member having a forming surface for forming a respective functional surface of an optical glass lens, which has at least one aspherical functional surface and a flange portion extending from the functional surface, said first mold member comprising:

an aspherical forming surface of said first mold member for forming an aspherical surface of the optical glass lens, a flange forming surface of said first mold member extending from the periphery of said aspherical forming surface, and an edge portion of said first mold member positioned on the periphery of said flange forming surface, wherein said second mold member is movable along an axis line and comprises:

a spherical forming surface of said second mold member having a radius and having a center positioned on said axis line, for forming a functional surface of the optical glass lens, a flange forming surface of said second mold member adjacent to and extending from the periphery of said spherical forming surface, for cooperating with said flange forming surface of said first mold member to form the flange portion of the optical glass lens, an extension of said second mold member extending from the periphery of said flange forming surface of said second mold member, and a second spherical surface of said second mold member provided on the extension and having a center identical to that of said spherical forming surface and having a radius different from that of said spherical forming surface, wherein said second spherical surface of said second mold member is structured such that it will engage with said edge portion by movement of said second mold member to determine the distance between said first and second mold members for forming the functional surface and the flange portion of the optical glass lens, and wherein said flange forming surfaces are not of spherical curvature and provide a lens flange whose curvature is not spherical.

* * * * *